Figure 1:
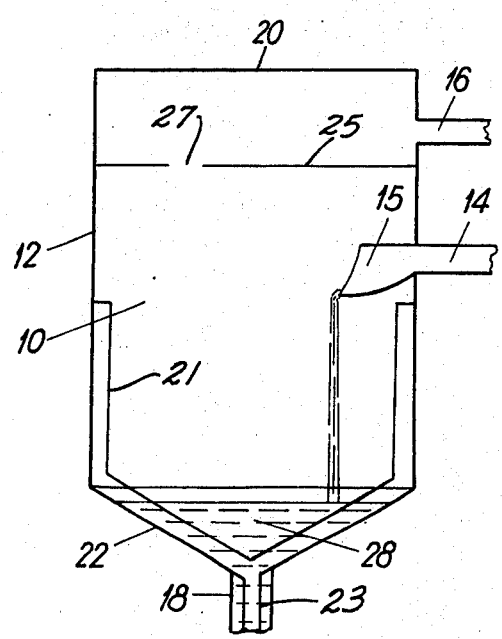

United States Patent [19]

Jones

[11] 3,993,462

[45] Nov. 23, 1976

[54] POLYMER-GAS SEPARATOR

[75] Inventor: John Prys Morgan Jones, Pontypool, England

[73] Assignee: Imperical Chemical Industries Ltd., London, England

[22] Filed: June 14, 1974

[21] Appl. No.: 479,326

Related U.S. Application Data

[63] Continuation of Ser. No. 249,996, May 3, 1972, abandoned.

[30] Foreign Application Priority Data

May 3, 1971 United Kingdom............... 12733/71

[52] U.S. Cl. .................................................. 55/204
[51] Int. Cl.².......................................... B01D 19/00
[58] Field of Search ................. 23/283, 285; 55/36, 55/41, 52, 165, 191–199, 201, 204

[56] References Cited

UNITED STATES PATENTS

| | | | |
|---|---|---|---|
| 3,113,843 | 10/1963 | Li | 23/285 |
| 3,241,296 | 3/1966 | Ramsey | 55/199 |
| 3,303,895 | 2/1967 | Fontenot | 55/191 X |
| 3,361,537 | 1/1968 | Ferrante | 159/6 X |
| 3,362,136 | 1/1968 | Burnham, Sr. et al | 55/165 |

Primary Examiner—Charles N. Hart
Assistant Examiner—Richard W. Burks
Attorney, Agent, or Firm—Herbert M. Adrian, Jr.

[57] ABSTRACT

A method and apparatus for the separation of a mixture of gas and polymer issuing from continuous polymerization apparatus in which the mixture is passed sideways into a vessel via a polymer-gas separating means while directing the polymer smoothly to a pool of molten polymer.

8 Claims, 2 Drawing Figures

POLYMER-GAS SEPARATOR

This is a continuation of application Ser. No. 249,996, filed May 3, 1972 and now abandoned.

The present invention relates to the separation of a mixture of gas and polymer issuing from continuous polymerisation apparatus and comprises a method and apparatus therefor.

The continuous production of high molecular weight polymers, such as fibre-forming polymers, has become a commercial reality over the past several years. In the production of many of these polymers, wherein the monomer is fed to a reactor as a water solution, or wherein the polymerisation is a condensation reaction which involves the liberation of water or other low molecular weight condensation by-products, the resulting by-product is eventually separated from the polymer prior to the further use of the polymer. For instance, polyamides such as nylon 6.6; 6.8; 6.10; polyesters, e.g. polyethylene terephthalate and the like, are produced by reactions wherein condensed and vaporised water or glycol is separated from the polymer prior to the formation of shaped articles such as fibres or extruded articles.

Various methods have previously been suggested for effecting the separation of a gas from a polymer, the separated polymer being led to a pool of molten polymer for further treatment. The problem here dealt with is primarily concerned with a method and apparatus which is suitable for long term operation with a high velocity stream of polymer-gas mixture without the requirement of frequent shutdown of the apparatus, the dismantling thereof and cleaning etc. in order to place such apparatus back into operational condition. The normally high velocity at which the polymer-gas mixture enters the separator or meltpool previously resulted in considerable splashing and carry-over of polymer with the gas stream to the gas exit from the separator, thereby quickly clogging the gas exit port and forming considerable gelatinous polymer adhering to the interior surfaces of the apparatus. In many cases stalactites are formed. Such stalactites would grow, become embrittled and eventually break off, dropping into the pool of molten polymer, thereby contaminating and clogging the polymer feed lines to the extrusion means and ultimately terminating the continuous polymerisation reaction. Pieces of the gelatinous polymer can also serve as nuclei for further gel formation, to the detriment of the main body of polymer.

The above effect is obviously exacerbated if the gas or polymer-gas mixture impinges substantially directly onto a pool of molten polymer which has been separated from said mixture.

Accordingly, one aspect of the present invention, provides an apparatus for separating gas from a molten polymer comprising a generally curvilinear vessel for the collection of molten polymer, said vessel comprising an inner generally concave wall with an inlet for a polymer-gas mixture, an outlet for gas and an outlet for polymer, said inlet for the polymer-gas mixture being positioned in said wall in a substantially sideways relationship thereto and terminating in polymer-gas separating means for directing incoming polymer quietly and smoothly to a pool of molten polymer while allowing the gas to separate from the polymer without directly impinging on the pool of molten polymer and to leave via the gas outlet and wherein said polymer outlet is positioned in the lower portion of said vessel and said polymer-gas inlet and said gas outlet are positioned above said polymer outlet.

In another aspect, the present invention provides a method for the separation of gas from a high velocity mixture of molten polymer and gas comprising passing said mixture sideways into a walled collection zone via a polymer-gas separating means, directing the polymer quietly and smoothly to a pool of molten polymer while allowing the gas to pass substantially freely to a gas outlet without directly impinging on the pool of molten polymer.

The polymer-gas separating means may direct incoming polymer onto the wall of the vessel while allowing the gas to separate from the polymer and to leave via the gas outlet.

By "sideways" we mean in a direction between 45° upwards or downwards of the horizontal. Sideways entry of the polymer-gas mixture is provided to avoid high velocity gas impinging on the meltpool and causing splashing and other undesirable effects.

The present method has distinct advantages compared to previously known separation methods because it operates in a manner whereby the buildup of gelatinous and decomposed polymer within the vessel is greatly reduced, thereby reducing the danger of contamination of the useful polymer with decomposition products which otherwise tended to collect within the separation means. Further, the present method of discharging the high velocity gas and polymer into the walled vessel comprising a pool of molten polymer commonly referred to as a meltpool, greatly reduces, if not eliminates, the splashing of incoming polymer and gas against the molten polymer in the meltpool which splashing has previously greatly contributed to a shortened meltpool life.

When there is both sideways as well as substantially tangential entry of the polymer into the collection vessel with directing of the polymer onto the vessel wall in the form of a quiet flow, the gas being separated from the polymer is not propelled directly into the reservoir of molten polymer but follows a substantially horizontal path around the walls of the vessel thus avoiding turbulence within the vessel to a considerable extent.

Figure 2:
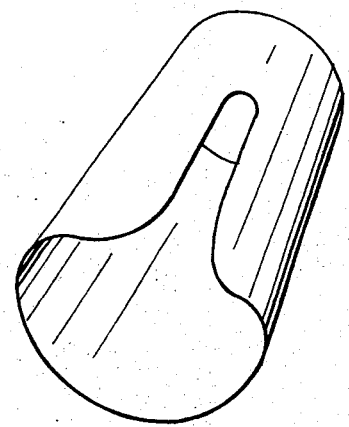

The invention will now be described, in no way limitatively, with reference to the following drawings, wherein:

FIG. 1 is a longitudinal sectional view of an apparatus in accordance with the present invention; and FIG. 2 represents one type of polymer-gas separating means fitted to the polymer-gas inlet.

While the present invention is suitable for the separation of gases from molten organic polymers in numerous polymerisation reactions, the presently described design is particularly suitable for use in conjunction with a nylon continuous polymerisation vessel such as in the polymerisation of polyamides such as nylon 6.6 (hexamethylene adipamide) and the like condensation polymers. Therefore, the invention will be described hereinafter with more particular reference to polyamides, although it will be understood that such apparatus and method is also useful in the separation of gases other than steam from a great variety of organic polymers. For instance, the process and apparatus can be used to separate polyoxymethylene from a process medium such as cyclohexane or dimethylformamide; to separate polymer in the aqueous pressure polymerisation of polyethylene, to separate polymers such as polyoxyethylene, polymethyl methacrylate or polyethylene from methylene chloride solvent, to separate monomer and steam in vacuum finishing polycaprolactam (nylon 6) and the like polyamides as described above.

Referring more specifically to the drawings, separation vessel 10, preferably comprises a cylindrical sidewall 12, polymer-gas mixture inlet 14, terminating in polymer-gas separating means 15 (shown separately in FIG. 2), gas outlet 16, polymer outlet means 18, ceiling 20, and bottom portion 22, which is preferably funnel-shaped. This apparatus can be readily modified in shape in numerous ways, such as having the vessel entirely in a funnel shape.

If a wall-scraping means 21 is present it is preferably mounted on a rotatable, driven shaft 23 and should be as close to sidewalls 12 and 22 as possible. Any wall-scraping means preferably extends from the bottom of vessel 10 upwardly along the sidewalls to a height sufficient to scrape most of the polymer from the sidewalls as it is rotated about the periphery of the separation vessel, avoiding, of course, the separator means 15, although shortened scraping means such as those extending up to the polymer-gas inlet means, or only covering the funnel shaped bottom, have been found to be adequate. Thus, any scraping means, if present, can be selected to suit the particular mode of operation and vessel design.

A pool of molten polymer 28 is located at the bottom of the separator vessel. The polymer flows quietly by gravity to the meltpool, or to a point on the wall of the vessel above said pool. If desired, screw feed means or other propelling means can be used to advance the polymer to the reservoir and polymer outlet. However, such means are not normally required with the illustrated apparatus, although certain modifications thereof may make such means particularly desirable.

Where necessary the polymer-carrying edge of the polymer-gas separator means 15 may be extended down to meet the meltpool itself, so producing a very quiet polymer flow.

The level of polymer in meltpool 28 is desirably controlled to a relatively constant level so as to provide a specific retention time in the separation vessel prior to being fed to or manifolded to the extrusion process or other end use. Therefore, in a preferred method of operation, polymer reservoir 28 has a sensing means associated therewith to control the meltpool level within predetermined limits by controlling the feed to the continuous polymeriser. Various electrical, mechanical and the like sensing devices are known for use in effecting such control.

Because the gas and polymer separation is normally effected at temperatures above 100° C and normally at temperatures of at least 10° C above the melting point of the polymer, separation vessel 10 is insulated and preferably heated to maintain the desired melt temperature.

Polymer-gas mixture inlet 14 is normally directly connected to a continuous polymerisation reactor such as a heated coil or other design, wherein steam is generated in the case of nylon 6.6 polymerisation, from the water of condensation and water of solution used with the monomer. The generated steam propels the polymer through the continuous reactor. Thus, considerable velocity is built up within the reactor because of the high temperatures therein, the volume of steam liberated, the diameter of the tubes comprising the coil involved, and the like, which are associated with the continuous polymeriser.

In the operation of the present separator, the polymer-gas mixture is normally propelled into the separator vessel by means of the high velocity gas, with the major proportion of the polymer travelling at a substantially slower rate than the gas and a small proportion of polymer being propelled at average velocities approaching or equal to the gas velocity. On entering the separator vessel, the gas rapidly expands and the velocity rapidly drops in a corresponding manner. The volume of the separator vessel 10 is sufficient in size compared to the polymer inlet and gas outlet to form an expansion zone to effect the rapid expansion of the gas and the velocity drop. In a preferred apparatus for the separation of nylon 6.6 and steam, the average gas velocity is reduced to below about 100 feet per minute prior to travelling more than about 75% of the distance around the periphery of the vessel. The sharp gas velocity drop greatly reduces, and in most instances, eliminates, at an efficiency level approaching 100%, the entrainment of polymer droplets which would other wise deposit on gas outlet 16 and elsewhere along the gas outlet route, thereby eventually restricting the flow of gas therethrough.

Polymer inlet means 14 and separator means 15 are positioned generally horizontally with respect to the separator vessel or aimed upwardly or downwardly up to about 45° from the horizontal. More preferably, they have a downward slope in the range of 5° to 30° from the horizontal. It is desirable to direct the high velocity polymer-gas stream in a manner whereby the polymer is let in a quiet and smooth manner to the pool of molten polymer while avoiding directly the polymer against the ceiling of said vessel or the molten polymer in the meltpool. Deflector means or, as noted above, a slight downward angle accomplishes this result. Also, it is preferred to position the polymer inlet a distance below the ceiling but above the meltpool, such as between about 10 to 70 per cent of the distance from ceiling to the top of the polymer meltpool.

A false ceiling 25, having one or more suitably positioned holes 27, may be located below gas outlet 16 if required.

Polymer-gas separating means 15 may be of any suitable shape or profile such as that shown in FIG. 2. Furthermore, said inlet may project into the separator vessel, such projection having any shape suitable for dealing best with the particular materials and apparatus used.

While the invention has been described more particularly with reference to various preferred embodiments useful for the production of polyamides and the like polymers, various modifications therein, such as those suggested herein can be readily made by those skilled in the art to adapt the present invention to a particular polymer separation system. Also, changes in the configuration of the vessel, the particular type of scraping means, when used, path through which the steam is directed prior to leaving the vessel and the like can be modified in keeping with the description of the invention, as is well within the skill of those in the art.

The following example illustrates but does not limit the present invention.

EXAMPLE 1

A mixture of molten nylon 6.6 polymer and steam from a continuous polymerisation coil apparatus maintained at 290° C. was introduced through a tube 1.75 inches in diameter into a separation vessel. The mixture flowed down the tube in a turbannular flow pattern at a rate of 415 g per minute of polymer and 585 g per minute of steam. The separation vessel was cylindrical with a conical meltpool at the bottom. The total height was 3 ft 2 ins and the diameter 1 ft 6 ins. The polymer and steam entered through a nozzle half way up the vessel. The nozzle was similar to the one depicted in FIG. 2; it was inclined down by about 30° from the horizontal and about 75° away from the radial direction. It directed the polymer smoothly into the pool of melt and directed the steam away from the melt surface. The apparatus ran for 32 days at a pressure of 260 mmHg. If no nozzle had been used then polymer streamers would have formed and it would have been necessary to shut the machine down after a few days.

I claim:

1. An apparatus for separating gas from a molten polymer comprising a generally curvilinear vessel for the collection of molten polymer, said vessel comprising an inner generally concave wall with an inlet for a polymer-gas mixture, an outlet for gas and an outlet for polymer, said inlet for the polymer-gas mixture being positioned in said wall in a substantially sideways relationship thereto and in a downward slope of 5° to 30° from the horizontal, said inlet terminating in polymer-gas separating means having an increased diameter at the terminal end thereof for reducing polymer velocity and directing incoming polymer quietly and smoothly to a pool of molten polymer, said polymer-gas separating means additionally having an enlarged slotted open area on the upper terminal portion thereof to allow the gas to separate from the polymer in a direction away from the pool of molten polymer and to leave via the vessel gas outlet and wherein said vessel polymer outlet is positioned in the lower portion of said vessel and said vessel polymer-gas inlet and said gas outlet are positioned above said vessel polymer outlet.

2. An apparatus according to claim 1 in which said inlet is adapted to introduce the mixture tangentially into said vessel and said polymer-gas separating means is adapted to direct incoming polymer onto the wall of said vessel.

3. An apparatus according to claim 1 in which said vessel has wall-scraping means for the removal of adhering polymer.

4. An apparatus according to claim 3 in which said wall-scraping means is mounted on a rotatable driven shaft.

5. An apparatus according to claim 1 in which said vessel has a bottom portion which is funnel-shaped.

6. An apparatus according to claim 1 in which said polymer-gas separating means has a polymer-carrying edge which extends down to meet said pool of molten polymer.

7. An apparatus according to claim 1 in which said inlet is positioned at a distance below the ceiling of the vessel of about 10 to 70% of the distance from said ceiling to the top of the pool of molten polymer.

8. An apparatus according to claim 1 in which the vessel has a false ceiling located below said outlet for gas and above said polymer-gas inlet, said false ceiling having a gaseous passageway therethrough.

* * * * *